(12) United States Patent
Clarke et al.

(10) Patent No.: US 7,613,781 B2
(45) Date of Patent: *Nov. 3, 2009

(54) EMAIL SMS NOTIFICATION SYSTEM PROVIDING ENHANCED CHARGE ACCOUNTING FEATURES AND RELATED METHODS

(75) Inventors: David James Clarke, Redmond, WA (US); Harshad N. Kamat, Maple Valley, WA (US); David Jaray Hanson, Snoqualmie, WA (US)

(73) Assignee: Teamon Systems, Inc., Issaquah, WA (US)

( * ) Notice: Subject to any disclaimer, the term of this patent is extended or adjusted under 35 U.S.C. 154(b) by 472 days.

This patent is subject to a terminal disclaimer.

(21) Appl. No.: 11/165,210

(22) Filed: Jun. 23, 2005

(65) Prior Publication Data

US 2006/0294190 A1 Dec. 28, 2006

(51) Int. Cl.
*G06F 15/16* (2006.01)
(52) U.S. Cl. ............................ 709/206; 709/207
(58) Field of Classification Search ............ 709/204, 709/206, 207; 713/445
See application file for complete search history.

(56) References Cited

U.S. PATENT DOCUMENTS

| | | | |
|---|---|---|---|
| 7,409,428 B1 * | 8/2008 | Brabec et al. | 709/206 |
| 2001/0034225 A1 * | 10/2001 | Gupte et al. | 455/412 |
| 2003/0011578 A1 * | 1/2003 | Bergqvist et al. | 345/179 |
| 2003/0054810 A1 * | 3/2003 | Chen et al. | 455/422 |
| 2003/0097410 A1 * | 5/2003 | Atkins et al. | 709/206 |
| 2004/0106418 A1 | 6/2004 | Cini et al. | |
| 2004/0148356 A1 * | 7/2004 | Bishop et al. | 709/206 |
| 2004/0198322 A1 * | 10/2004 | Mercer | 455/412.1 |
| 2005/0054286 A1 * | 3/2005 | Kanjilal et al. | 455/3.05 |
| 2005/0215250 A1 * | 9/2005 | Chava et al. | 455/433 |
| 2006/0036848 A1 * | 2/2006 | Brown et al. | 713/156 |
| 2006/0155811 A1 * | 7/2006 | Goh et al. | 709/206 |
| 2006/0294366 A1 * | 12/2006 | Nadalin et al. | 713/156 |
| 2006/0294368 A1 * | 12/2006 | Adams et al. | 713/156 |
| 2007/0015517 A1 * | 1/2007 | Casey | 455/456.1 |
| 2007/0072617 A1 * | 3/2007 | Lewis et al. | 455/445 |
| 2007/0142029 A1 * | 6/2007 | Willehadson et al. | 455/405 |

OTHER PUBLICATIONS

SMS FAQ, TIM, available at www.privati.tim.it/template/temp_ling/tim_main_ling1_eng/0,,1138_2,00.html.

* cited by examiner

*Primary Examiner*—Jeffrey Pwu
*Assistant Examiner*—Gerald Smarth
(74) *Attorney, Agent, or Firm*—Allen, Dyer, Doppelt, Milbrath & Gilchrist, P.A.

(57) ABSTRACT

A communications system may include at least one wireless communications device and at least one electronic mail (email) server for storing email messages for the at least one wireless communications device. An email relay server may detect a new email message on the at least one email server and, based thereon, send a short message service (SMS) notification with an original SMS identifier to the at least one wireless communications device. The at least one wireless communications device may detect the SMS notification and send an instruction to the email relay server to thereafter send any subsequent SMS notification with a different SMS identifier rather than the original SMS identifier.

24 Claims, 5 Drawing Sheets

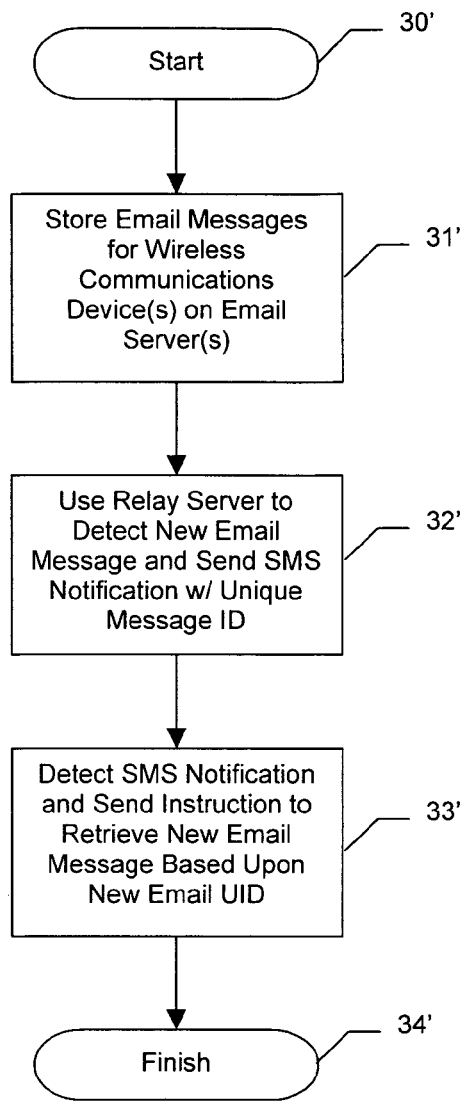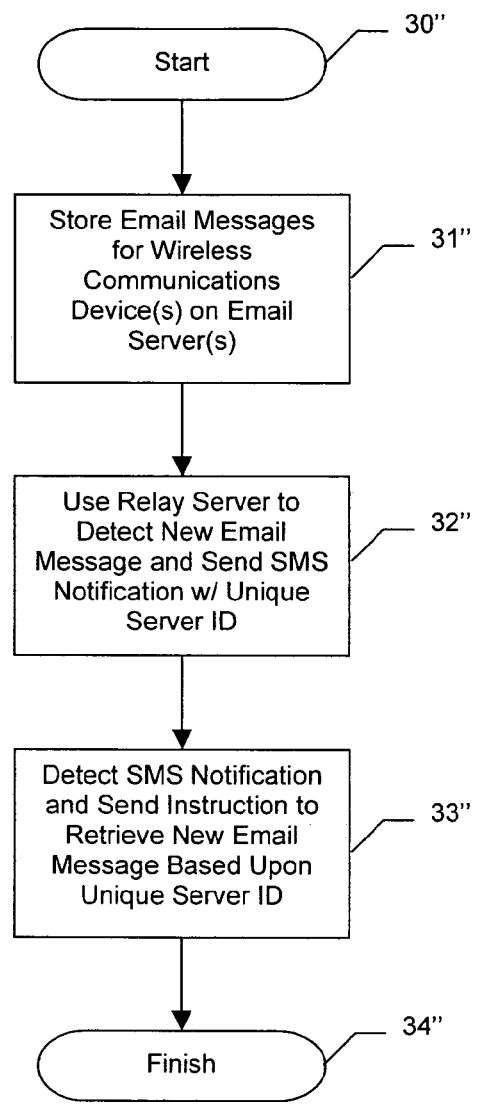
FIG. 7
FIG. 8

EMAIL SMS NOTIFICATION SYSTEM PROVIDING ENHANCED CHARGE ACCOUNTING FEATURES AND RELATED METHODS

FIELD OF THE INVENTION

The present invention relates to the field of communications systems, and, more particularly, to electronic mail (email) communication systems and related methods.

BACKGROUND OF THE INVENTION

Electronic mailboxes are used to store electronic mail (email) messages. Electronic mailboxes are connected to the Internet to enable users to send and receive incoming and outgoing email messages. These mailboxes may also be extended to deliver email to mobile wireless communication devices via wireless networks. In the case of a corporation, electronic mailboxes are typically located on email servers at the corporation. On the other hand, mailboxes for small businesses or individuals are typically located on Internet service provider (ISP) email servers.

Mail user agents (MUAS) are applications which use a technique called polling to relay messages from the mail server to the mail program at a user's computer or mobile wireless communications device. An MUA is a program running either on a user's personal computing device (mobile or stationary), or on a shared email relay server that checks for new mail on behalf of a multitude of such users. More particularly, polling is the retrieval of incoming messages from other users at the mail server and delivery of these messages to the user's mailbox.

An email relay server may be particularly appropriate where emails need to be relayed to wireless communications devices. This is because having a wireless communications device, such as a cellular device, polling an email server(s) via a cellular network may result in increased usage charges for users as well as consumption of network resources. Thus, some email systems use an email relay server that checks one or more electronic user mailboxes for a given user, and provides a notification message to the user's wireless communications device when a new email message(s) is available. The wireless communications device then polls the email relay server for the new email message(s), which therefore reduces the amount of wireless communications resources consumed by the device.

One particularly convenient approach to providing email notifications is through short message service (SMS) messages. SMS is a system that is used for sending short text messages (i.e., 160 characters or less) over wireless networks. Many cellular devices and cellular network carriers support SMS messaging. Yet, such carriers also typically charge users for SMS text messaging. Using SMS notifications to prompt a wireless communications device to poll for new messages may be problematic in that it could result in significant SMS messaging charges for users.

Moreover, such, SMS notification messages may not be displayed by wireless communications devices like a regular SMS text message, since the device automatically responds to such messages (i.e., polls for the new email messages) without involving the user. Users may be particularly displeased with being charged for SMS messages they did not even know they were receiving.

BRIEF DESCRIPTION OF THE DRAWINGS

FIGS. 7 and 8 are flow diagrams of alternate communications methods in accordance with the present invention.

DETAILED DESCRIPTION OF THE PREFERRED EMBODIMENTS

Figure 1:
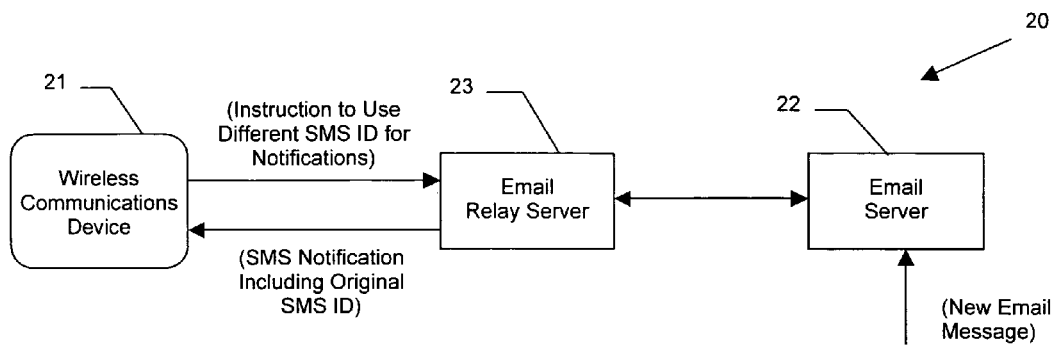
FIG. 1 is schematic block diagram of a communications system in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternate embodiments.

The present application generally relates to a communications system which may be summarized as follows. The system may include at least one wireless communications device, and at least one electronic mail (email) server for storing email messages for the at least one wireless communications device. The system may further include an email relay server for detecting a new email message on the at least one email server and, based thereon, sending a short message service (SMS) notification with an original SMS identifier to the at least one wireless communications device. Moreover, the at least one wireless communications device may detect the SMS notification and send an instruction to the email relay server to thereafter send any subsequent SMS notification with a different SMS identifier rather than the original SMS identifier.

More particularly, each SMS identifier may comprise an SMS source address. Furthermore, the original SMS identifier may have a usage charge associated therewith, and the different SMS identifier may not have a usage charge associated therewith. The email relay server, upon receiving the instruction, may use the different SMS identifier for future SMS notifications, and use the original SMS identifier for other messages.

The at least one wireless communications device may send an email retrieval request to the email relay server upon receiving the SMS notification. Also, the email relay server may relay the stored new email message from the at least one email server to the at least one wireless communications device based upon the email retrieval request.

Furthermore, the at least one email server may comprise a plurality of email servers. The system may further include a wide area network through which the at least one email server and the email relay server may communicate. The system may also include a wireless communications network through which the at least one wireless communications device and the email relay server communicate. By way of example, the wireless communications network may be a cellular network.

A communications method aspect may include storing email messages for at least one wireless communications device on at least one electronic mail (email) server. The method may further include using an email relay server to detect a new email message on the at least one email server and, based thereon, send a short message service (SMS) notification with an original SMS identifier to the at least one wireless communications device. In addition, the SMS notification may be detected and an instruction may be sent to the email relay server to thereafter send any subsequent SMS notification with a different SMS identifier rather than the original SMS identifier.

Referring initially to FIG. 1, a communications system 20 in accordance with the present invention is first described. The system 20 illustratively includes a wireless communications device 21 and an electronic mail (email) server (i.e., email storage device) 22. The email server 22 stores email messages for the wireless communications device 21. The system 20 further illustratively includes an email relay server 23 which detects new email messages on the email server 22 and, based thereon, sends a short message service (SMS) notification with an original SMS identifier to the wireless communications device 21.

In particular, the original SMS identifier may be an original SMS source address associated with the email relay server 23 that is included in the SMS notification. The format and various components of SMS messages are well known to those skilled in the art and thus require no further discussion herein.

Typically, the carrier or wireless network provider from which the wireless communications device 21 receives service will charge for SMS messages which are delivered to (or sent from) the wireless communications device. In the case of an SMS notification, a mail user agent (MUA) at the wireless handheld device 21 detects the SMS notification from the email relay server 23 and ordinarily sends an email retrieval or polling request (which may also be an SMS message) to the email relay server 23. This requests or polls the email relay server 23 for the new email messages stored at the email server 22. The email relay server 23 then relays the stored new email message from the email server 22 to the wireless communications device 21.

However, receipt of the SMS notification and sending of the email retrieval request are typically done without any user involvement or knowledge, i.e., these operations are transparent to the user. The user is only given an indication when the new email message(s) has been retrieved and is available to read. Since the user never sees SMS notifications, and since numerous SMS notifications may result in significant usage charges, carriers may not want to charge users for these types of SMS messages.

To provide a convenient approach for distinguishing between SMS notifications and ordinary SMS messages for accounting purposes, the MUA on the wireless communications device 21 may advantageously detect the SMS notification and send an instruction to the email relay server 23 to thereafter send any subsequent SMS notification with a different SMS identifier (e.g., a different SMS source address) rather than the original SMS identifier. That is, the MUA determines that the SMS notification is not a typical SMS text message, for example, and thus instructs the email relay server to use a different SMS identifier for future notifications.

This allows the carrier to easily segregate SMS messages for which a usage charge will be associated (i.e., messages with the original or default SMS identifier) from those that will not carry a usage charge or a reduced usage charge (i.e., SMS notifications with the different SMS identifier). In some embodiments the email relay server 23 may need to send SMS messages to the wireless communications device 21 other than SMS notifications for which the user should be charged. For example, such messages may notify the user that an electronic mailbox is full, etc. In this case, the email relay server 23 simply uses the original SMS identifier, and the user will be charged by the carrier.

Figure 2:
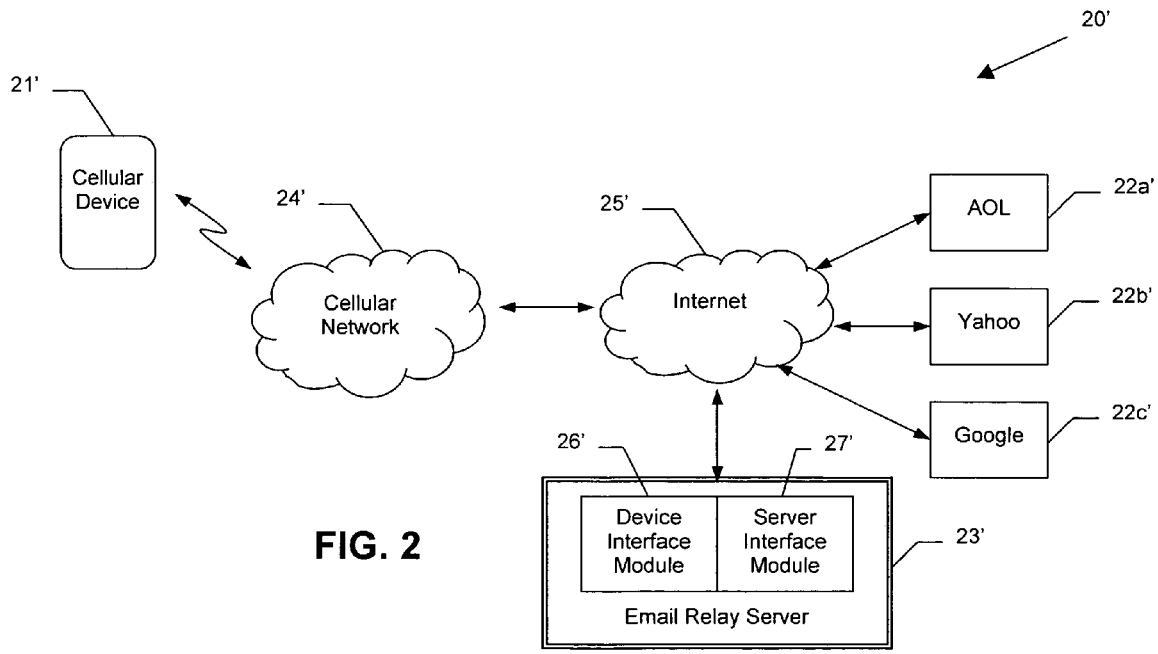
FIG. 2 is schematic block diagram of an alternate embodiment of the communications system of FIG. 1.

An alternate embodiment of the system 20' is illustrated in FIG. 2. Here, multiple email servers 22a', 22b', 22c' maintained by email service providers such as America Online (AOL), Yahoo, Google, etc. are shown. Of course, other email servers, such as corporate servers used by corporations for their employees, etc., may also be used. Furthermore, the wireless communications device 21' in the illustrated embodiment is a cellular device, and more than one such device may be used in the system 20', as will be appreciated by those skilled in the art.

The cellular device 21' communicates with the email relay server 23' via a cellular network 24' and a wide area network 25' such as the Internet, as will also be appreciated by those skilled in the art. It should be noted, however, that other wireless communications devices and networks may be used, such as wireless local area networks (WLANs), for example. Moreover, in some embodiments, the instruction to use the different SMS identifier may be generated by the carrier (i.e., the cellular network 24') rather than the MUA of the wireless communications device 21', if desired.

The email relay server 23' illustratively includes a device interface module 26' which interfaces with the cellular device 21'. Moreover, the email relay server 23' also illustratively includes a server interface module 27' which interfaces with the email servers 22a'-22c' via the wide area network 25' (i.e., Internet). The device interface module 26' and server interface module 27' may be implemented using software programs which are executed on the email relay server 23', for example.

Figure 5:
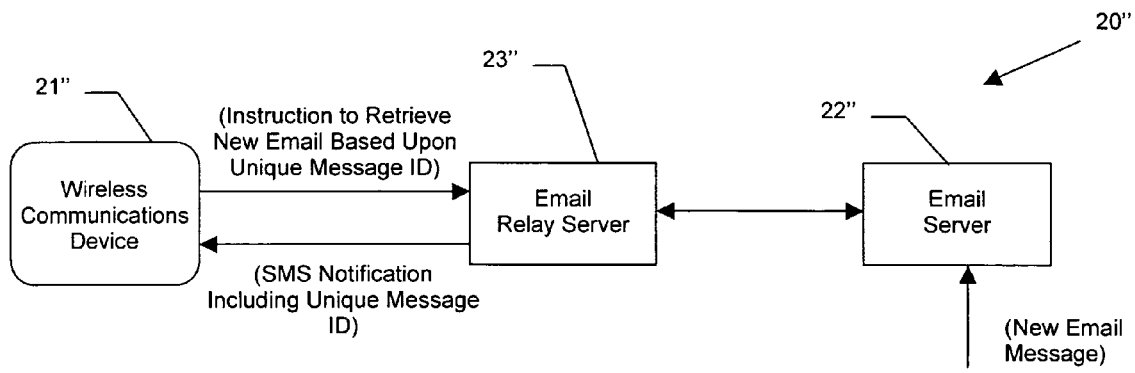
FIGS. 5 and 6 are schematic block diagrams of alternate embodiments of the communications system of FIG. 1.

Turning now additionally to FIG. 5, in accordance with another advantageous aspect of the invention the email relay server 23" may include a unique message identifier (ID) of the new email message in the SMS notification it provides to the wireless communications device 21". In this way, the wireless communications device 21" may send an email retrieval request to the email relay server 23" instructing the email relay server to retrieve the new email message based upon the unique message ID. That is, the wireless communications device 21" may instruct the email relay server 23" to retrieve only the new message(s) for which unique message IDs are provided.

The unique message ID allows the email relay server 23" to identify which messages the wireless communications device 21" is polling for, and thus avoid the need to parse through and retrieve numerous messages each time a polling operation occurs. As such, this feature advantageously allows bandwidth and processing resources to be conserved, while still providing the user ready access to his or her new email on a timely basis. It should be noted that this feature may be implemented with or without using the original and different SMS source addresses discussed above.

Figure 6:
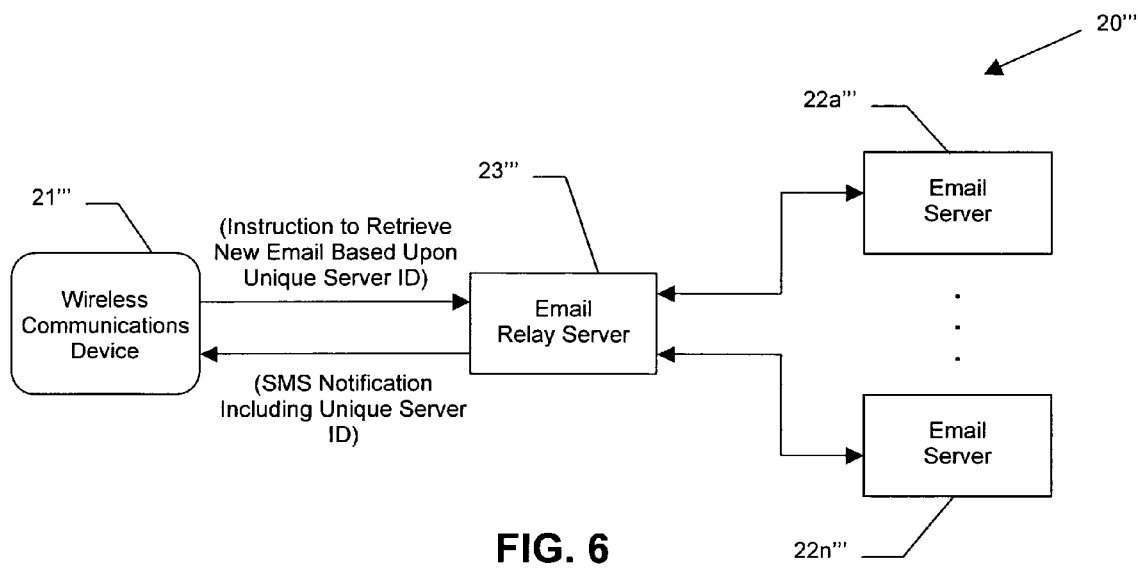

Referring now additionally to FIG. 6, in accordance with still another advantageous aspect of the invention the email relay server 23''' may include a unique server ID in SMS notifications identifying the given email server 22a'''-22n''' at which a new email message(s) has been stored. In this way, the wireless communications device 21''' may instruct the email relay server 23''' to retrieve email messages from the given server based upon the unique server ID. That is, the wireless communications device 21''' can instruct the email relay server 23''' to retrieve email messages only from the given server if desired, again providing bandwidth and processing savings, as will be appreciated by those skilled in the art. As with the other above-described features, the unique server ID may similarly be used independently or in conjunction with such other features.

Figure 3:
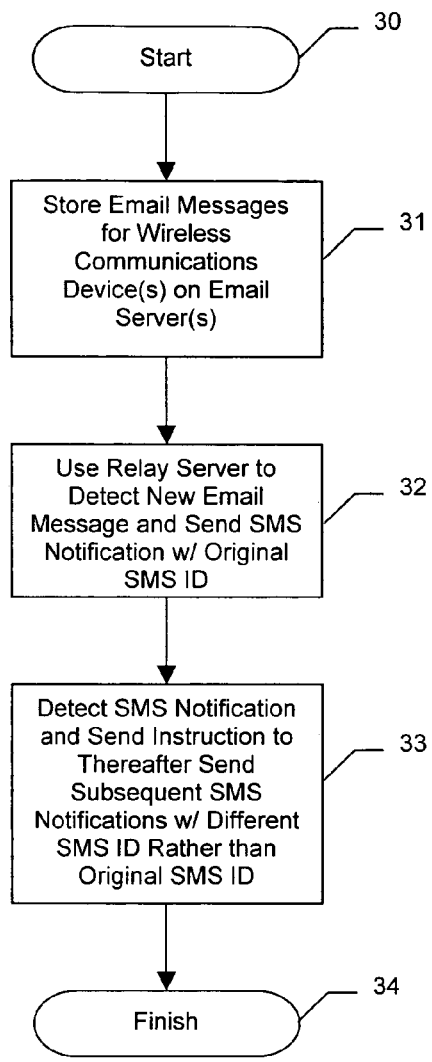
FIGS. 3 and 4 are flow diagrams of communications methods in accordance with the present invention.

A communications method aspect of the invention is now described with reference to FIG. 3. The method begins (Block 30) with storing email messages for the wireless communications device(s) 21 on the electronic mail (email) server(s) 22, at Block 31. An email relay server 23 is used to detect a new email message on the email server 22 and, based thereon, send an SMS notification with an original SMS identifier to the wireless communications device 21, at Block 32. In addition, the SMS notifications is detected at the wireless communications device 21, and an instruction is sent to the email relay server 23 to thereafter send any subsequent SMS notification with a different SMS identifier rather than the original SMS identifier, at Block 33, thus concluding the illustrated method (Block 34).

Figure 4:
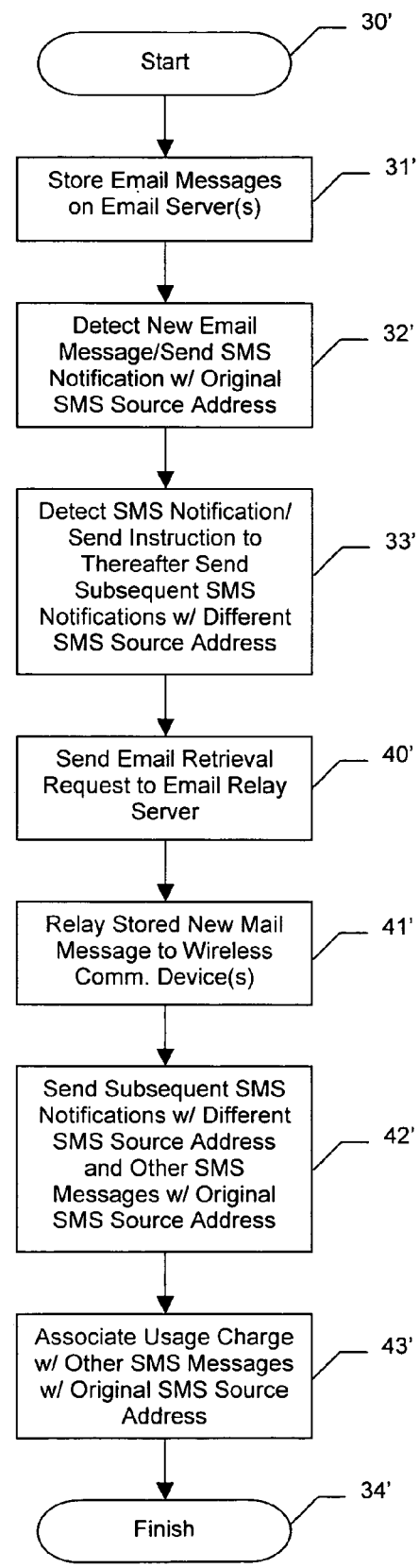

Additional method aspects are further described with reference to FIG. 4. More particularly, the wireless communications device 21 may further send an email retrieval request to the email relay sever 23, at Block 40', which in turn relays the newly stored messages from the email server 22, at Block 41', as discussed further above. Moreover, subsequent SMS notifications are sent to the wireless communications device 21 using the different SMS identifier, while other SMS messages sent by the email relay server 23 to the wireless communications device may be with the original SMS identifier, at Block 42'. In addition, the carrier, for example, may associate or account for usage charges of SMS messages with the original SMS identifier, while not associating a usage charge with SMS notifications with the different SMS identifier, at Block 43'.

Another method aspect is now described with reference to FIG. 7. Beginning at Block 30', email messages for the at least one wireless communications device 21" are stored on at least one electronic mail (email) server 22", at Block 31'. The method further illustratively includes using the email relay server 23" to detect a new email message on the at least one email server 22" and, based thereon, send an SMS notification with a unique message ID of the new email message to the at least one wireless communications device 21", at Block 32'. In addition, the method may also include detecting the SMS notification and sending an email retrieval request to the email relay server 23" instructing the email relay server to retrieve the new email message based upon the unique message ID (Block 33'), as discussed further above, thus concluding the illustrated method (Block 34').

Still another communications method aspect is now described with reference to FIG. 8. Beginning at Block 30", email messages are stored for the at least one wireless communications device 21''' on a plurality of email servers 22a'''-22n''', at Block 31". The method further illustratively includes using the email relay server 23''' to detect at least one new email message on a given one of the email servers and, based thereon, send an SMS notification with a unique server ID of the given email server to the at least one wireless communications device 21''', at Block 32". Furthermore, the method also illustratively includes detecting the SMS notification and sending an email retrieval request to the email relay server 23''' instructing the email relay server to retrieve email messages from the given server based upon the unique server ID, at Block 33", as discussed further above, thus concluding the illustrated method (Block 34").

Figure 9:
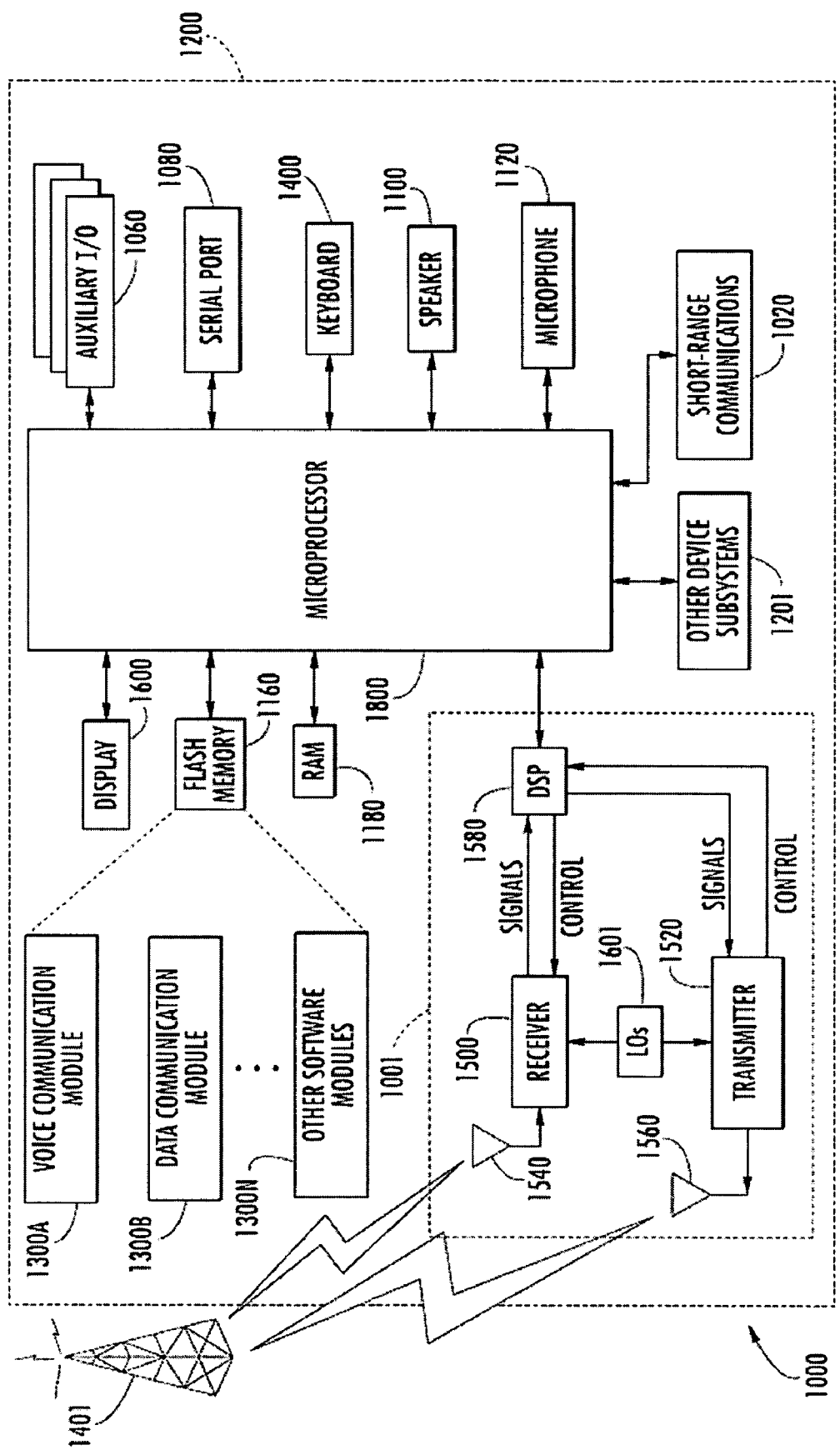
FIG. 9 is a schematic block diagram of an exemplary mobile wireless communications device arrangement for use with the present invention.

Additional features and components of a mobile wireless communication device in accordance with the present invention will be further understood with reference to FIG. 9. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 are shown schematically in FIG. 9. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
   at least one wireless communications device;
   at least one electronic mail (email) server for storing email messages for said at least one wireless communications device; and
   an email relay server for detecting a new email message on said at least one email server and, based thereon, sending a short message service (SMS) notification with an original SMS identifier to said at least one wireless communications device;
   said at least one wireless communications device detecting the SMS notification and sending an instruction to said email relay server to thereafter send any subsequent SMS notification with a different SMS identifier rather than the original SMS identifier.

2. The communications system of claim 1 wherein each SMS identifier comprises an SMS source address.

3. The communications system of claim 1 wherein the original SMS identifier has a usage charge associated therewith; and wherein the different SMS identifier does not have a usage charge associated therewith.

4. The communications system of claim 1 wherein said email relay server, upon receiving the instruction, uses the different SMS identifier for future SMS notifications and uses the original SMS identifier for other messages.

5. The communications system of claim 1 wherein said at least one wireless communications device sends an email retrieval request to said email relay server upon receiving the SMS notification, and wherein said email relay server relays the stored new email message from said at least one email server to said at least one wireless communications device based upon the email retrieval request.

6. The communications system of claim 1 wherein said at least one email server comprises a plurality of email servers.

7. The communications system of claim 1 further comprising a wide area network through which said at least one email server and said email relay server communicate.

8. The communications system of claim 1 further comprising a wireless communications network through which said at least one wireless communications device and said email relay server communicate.

9. The communications system of claim 8 wherein said wireless communications network comprises a cellular network.

10. A communications system comprising:
    at least one wireless communications device;

at least one electronic mail (email) server for storing email messages for said at least one wireless communications device;

an email relay server for detecting a new email message on said at least one email server and, based thereon, sending a short message service (SMS) notification with an original SMS identifier to said at least one wireless communications device; and a wireless communications network through which said at least one wireless communications device and said email relay server communicate, said wireless communications device sending an instruction to said email relay server after receiving the SMS notification with the original SMS identifier to thereafter send any subsequent SMS notification with a different SMS identifier rather than the original SMS identifier.

11. The communications system of claim 10 wherein each SMS identifier comprises an SMS source address.

12. The communications system of claim 11 wherein the original SMS identifier has a usage charge associated therewith; and wherein the different SMS identifier does not have a usage charge associated therewith.

13. The communications system of claim 11 wherein said email relay server, upon receiving the instruction, uses the different SMS identifier for future SMS notifications and uses the original SMS identifier for other messages.

14. An email relay server for cooperating with at least one wireless communications device and at least one electronic mail (email) server for storing email messages for the at least one wireless communications device, the email relay server comprising:

a server interface module for detecting a new email message on the at least one email server; and a device interface module for
sending a short message service (SMS) notification with an original SMS identifier to the at least one wireless communications device based upon detection of the new email message by said server interface module, and sending subsequent SMS notifications to the at least one wireless communications device with a different SMS identifier rather than the original SMS identifier based upon receiving an instruction from the at least one wireless communications device.

15. The email relay server of claim 14 wherein each SMS identifier comprises an SMS source address.

16. The email relay server of claim 14 wherein the original SMS identifier has a usage charge associated therewith; and wherein the different SMS identifier does not have a usage charge associated therewith.

17. The email relay server of claim 14 wherein said device interface module, upon receiving the instruction, uses the different SMS identifier for future SMS notifications and uses the original SMS identifier for other messages.

18. The email relay server of claim 14 wherein said device interface module and said server interface module cooperate to relay the stored new email message from the at least one email server to the at least one wireless communications device based upon receiving an email retrieval request from the at least one wireless communications device.

19. A communications method comprising:
storing email messages for at least one wireless communications device on at least one electronic mail (email) server;

using an email relay server to detect a new email message on the at least one email server and, based thereon, send a short message service (SMS) notification with an original SMS identifier to the at least one wireless communications device;

detecting the SMS notification and sending an instruction to the email relay server to thereafter send any subsequent SMS notification with a different SMS identifier rather than the original SMS identifier.

20. The method of claim 19 wherein each SMS identifier comprises an SMS source address.

21. The method of claim 19 wherein the original SMS identifier has a usage charge associated therewith; and wherein the different SMS identifier does not have a usage charge associated therewith.

22. The method of claim 19 further comprising, upon receiving the instruction, using the original SMS identifier for messages other than SMS notifications.

23. The method of claim 19 further comprising:
sending an email retrieval request from the at least one wireless communications device to the email relay server upon receiving the SMS notification; and using the email relay server to relay the stored new email message from the at least one email server to the at least one wireless communications device based upon the email retrieval request.

24. The method of claim 19 wherein the at least one email server comprises a plurality of email servers.

* * * * *

UNITED STATES PATENT AND TRADEMARK OFFICE
CERTIFICATE OF CORRECTION

| | | |
|---|---|---|
| PATENT NO. | : 7,613,781 B2 | Page 1 of 1 |
| APPLICATION NO. | : 11/165210 | |
| DATED | : November 3, 2009 | |
| INVENTOR(S) | : Clarke et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 925 days.

Signed and Sealed this

Fourteenth Day of December, 2010

David J. Kappos
*Director of the United States Patent and Trademark Office*